Patented June 9, 1931

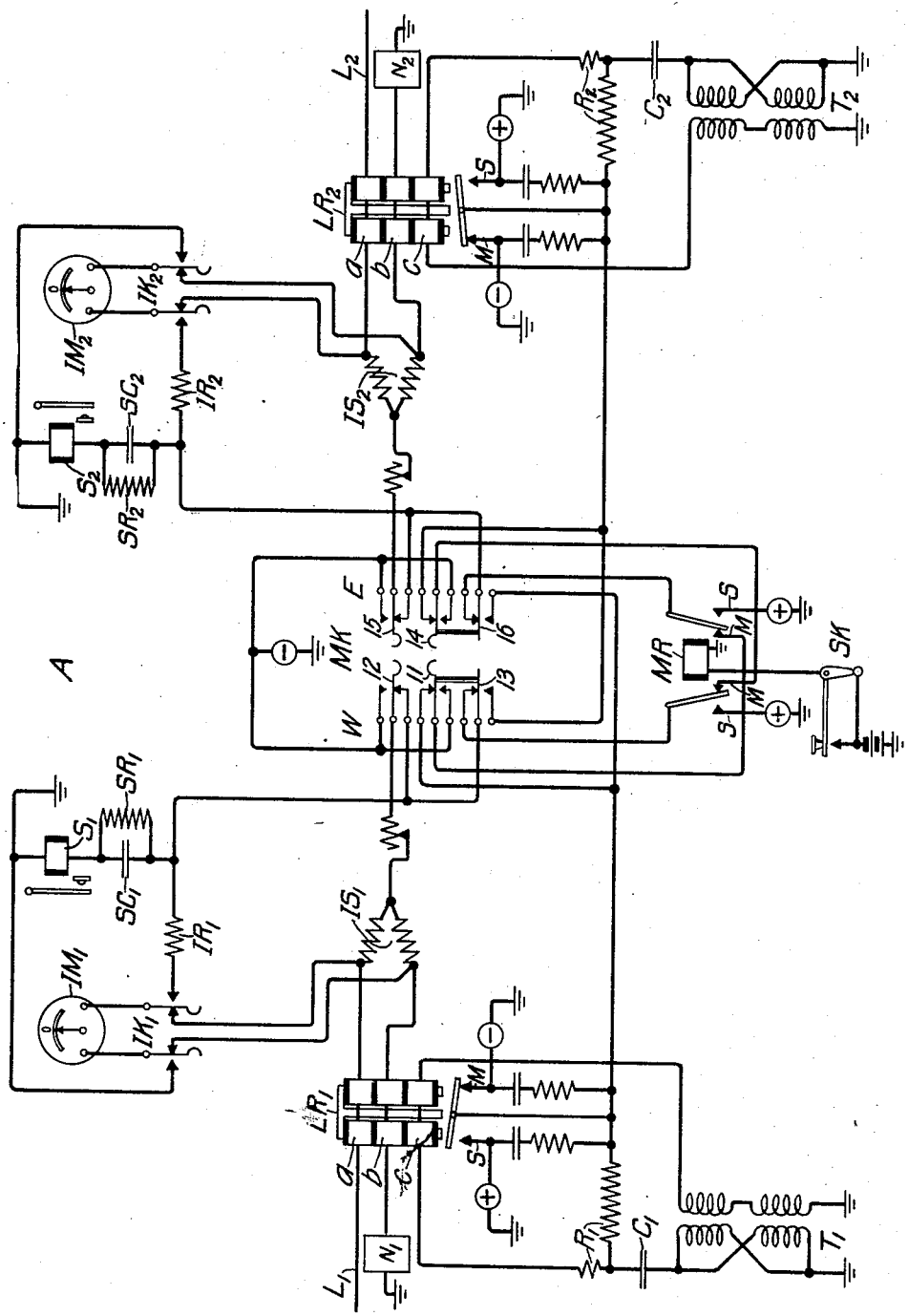

1,809,026

UNITED STATES PATENT OFFICE

GEORGE C. CUMMINGS, OF ORANGE, NEW JERSEY, ASSIGNOR TO WESTERN ELECTRIC COMPANY, INCORPORATED, OF NEW YORK, N. Y., A CORPORATION OF NEW YORK

TELEGRAPH SYSTEM

Application filed August 8, 1928. Serial No. 298,158.

This invention relates to telegraph systems and more particularly to high speed telegraph repeaters of the direct point duplex type.

The object of the invention is to provide improved testing and monitoring equipments in repeaters of this type.

The indicating meters which heretofore have been used in duplex telegraph repeaters to indicate line balance have been of the two coil differential type and were usually connected at the bridge point or apex between the line and the balancing network. One of the operating coils of such a meter would be connected in the line circuit and the other coil in the balancing circuit, the windings being opposed so that the meter would point to zero when perfect balance was established. A meter could thus be used only at this particular point in the circuit. When it was desirable to test the associated line relay it was necessary to remove the relay from the repeater panel and test it at a special test panel.

In accordance with the present invention the indicating meter may be utilized for more than one purpose. The meter may thus act, in effect, as a differential meter for indicating balance condition; it may further be used to measure current strength of the impulse current or to indicate current reversals in the transmitting or receiving circuits.

The present invention further provides for improved monitoring means whereby an attendant may transmit monitoring impulses simultaneously over both line sections, or in the case of a fault in one line section or its associated equipment, may disconnect that section from the other section and send monitoring impulses over that other section.

Other features and advantages of the invention will appear from the detailed description hereinafter given.

The preferred form of the invention and its operation and advantages will be described in connection with the accompanying drawing, which is a diagrammatic showing of the circuit and apparatus of a repeater station arranged in accordance with this invention.

In the drawing is shown the essential parts of a repeater station A which is a direct point, differential, full duplex repeater for repeating signals simultaneously in both directions between two grounded line sections indicated as $L_1$ and $L_2$ in the drawing.

Polar line relays $LR_1$ and $LR_2$ have their operating windings $a$ and $b$ connected to line sections $L_1$ and $L_2$ and to balancing networks $N_1$ and $N_2$, respectively, in accordance with the well-known differential duplex system. The armatures of relays $LR_1$ and $LR_2$ are operated by incoming signals through the windings $a$ and $b$ and move between spacing and marking contacts S and M to transmit battery impulses of opposite polarities over lines $L_2$ and $L_1$, respectively.

Relays $LR_1$ and $LR_2$ are provided with a third winding $c$ each of which is included in a vibrating circuit. These vibrating circuits comprise transformers $T_1$ and $T_2$, condensers $C_1$ and $C_2$, and resistances $R_1$ and $R_2$ which are connected together and to the winding $c$ and the armatures of the relays to form a vibrating circuit which derives operating impulses from the marking and spacing potentials at the relay armatures and serve to supply the operating power for the armatures under the control of windings $a$ and $b$ in a manner as described in my copending application Serial No. 143,335, filed October 22, 1926.

A sending key SK is provided for transmission of monitoring impulses and is connected to monitoring relay MR which responds to the operations of the key SK by operating its two armatures for transmitting marking and spacing potentials through the operating windings of relays $LR_1$ and $LR_2$ to the lines $L_1$ and $L_2$, respectively. A monitoring key MK having a normal and an east and a west position is inserted in the circuits between the line relays $LR_1$ and $LR_2$ as will be hereinafter described. Sounders $S_1$ and $S_2$ are provided for monitoring purposes and are normally associated with their respective line relays $LR_1$ and $LR_2$ but may by means of monitoring key MK both be associated with either one of these relays.

The indicating meters $IM_1$ and $IM_2$ are provided for observation of signals and line balance under different conditions. These meters are of the single coil type and have a double indicating scale with a zero mid-point and are adapted to operate in opposite directions in accordance with the direction of the operating current. The meters are connected to keys $IK_1$ and $IK_2$ respectively whereby it is possible to connect the meters to different points in the circuit at which it is desirable to observe the impulses or the current. For this purpose shunt resistances $IS_1$ and $IS_2$ are inserted at the apexes of the line sections $L_1$ and $L_2$ respectively, the middle point of each resistance forming the apex and the two branches being connected in series with the windings $a$ and $b$ respectively of the associated line relay. Connections from the end points of the shunt resistances lead to normally closed contact points on the indicator keys. With these keys in normal position the meters may be used to indicate the line balance or incoming current reversals in a manner similar to that in prior circuits in which differential meters have been used for these purposes. The alternate contacts on each indicator key are connected to the sounder circuit associated with the respective relay whereby the meter may be connected across the impedance of the sounder in series with another impedance comprising a condenser and resistance in multiple which are inserted in this circuit to facilitate the operation of the sounder. Thus by throwing the indicator key to its alternate position the meter will be subject to potential variations and alternations between the end points of the sounder circuit. Limiting resistances $IR_1$ and $IR_2$ are inserted in this test circuit to limit the metering current. The meters may thus be utilized for the observation of reversals produced either by the armatures of the line relays or by the armatures of the monitoring relay MR depending upon the position of the monitoring key MK.

The operation of this circuit will now be described. In the normal operation of the repeater station A the signals incoming over line section $L_1$ would pass through the winding $a$ of relay $LR_1$, resistance $IS_1$ through contacts of the key MK and the relay MR to the armature of the relay $LR_2$ and through the battery to ground. Some current also flows through the winding $b$ and network $N_1$ to ground and aids in the operation of the relay. Windings $a$ and $b$ act accumulatively in response to such received signals to overcome the opposing action of winding $c$ on the armature, which will be assumed to be resting against the marking contact as shown in the drawing, in response to the normal line condition. Under the influence of the reversing current in windings $a$ and $b$ the armature leaves the marking contact and continues its movement with the aid also of winding $c$ to the spacing contact where it will be held because of the greater strength of the line current than that in winding $c$. The cooperation of the winding $c$ and its associated vibrating circuit with the operating windings $a$ and $b$ is similar to that described in detail for similar relays disclosed in my copending application already referred to. With the armature of line relay $LR_1$ touching the spacing contact a current impulse will be transmitted from positive battery over the spacing contact and armature of line relay $LR_1$, normally closed contact and spring 11 of monitoring key MK, marking contact and armature of monitoring relay MR, normal contact and spring 16, and normal contact and spring 15 of key MK to the apex of resistance $IS_2$ where the impulse will be divided in the usual manner through windings $a$ and $b$ of line relay $LR_2$ and over line section $L_2$ and artificial line $N_2$. The line relay $LR_2$, of course, remains unaffected since the windings $a$ and $b$ are differentially related with respect to outgoing signals, and the line $L_2$ is balanced by the network $N_2$.

Signals incoming over line section $L_2$ will be received and repeated in a manner similar to that just described for signals received over line section $L_1$. The armature of relay $LR_2$ in response to the incoming signal transmits repeated signals over a circuit from the armature over the normal contact and spring 14 of key MK, marking contact and armature of relay MR, normal contact and spring 13 and normal contact and spring 12 of key MK, to the apex of resistance $IS_1$ and through the windings $a$ and $b$ of line relay $LR_1$ to line section $L_1$ and artificial line $N_1$.

Thus, under normal operating conditions signals may be received and repeated simultaneously in both directions.

The sounder $S_1$ is included in a leak circuit which is connected to the transmitting circuit between the armature of relay $LR_2$ and the apex of resistance $IS_1$. The resistance $SR_1$ included in this leak circuit serves to limit the sounder current in order to reduce to a minimum the unbalance caused by this leak circuit, and the condenser $SC_1$ which is connected in multiple to resistance $SR_1$ serves to temporarily supply a greater current to the sounder than is permitted by the resistance, thus insuring quick and certain operation of the sounder at a small expenditure of energy. Sounder $S_2$ is similarly connected through resistance $SR_2$ and capacity $SC_2$ in multiple to the transmitting circuit between the armature $LR_1$ and the apex of $IS_2$. These sounders normally respond to the regenerated impulses.

Under normal operating conditions the meter $IM_1$ is connected across the terminals of resistance $IS_1$. When the network $N_1$ is properly balanced against the line $L_1$ and the distant end of the line is grounded for balancing purposes, the current in the two branches of resistance $IS_1$ originating at the armature of relay $LR_2$ are equal and the corresponding potential drops in the two branches of the resistance $IS_1$ consequently are equal, for which reason there will be no potential difference between the end points of the resistance and no current will flow through the meter which by pointing to zero will indicate perfect line balance. Current incoming over line $L_1$ and passing through both branches in series of resistance $IS_1$ will produce accumulative potential drops in those branches which will cause a current to flow through the meter, the direction of which will depend upon the direction of the current through resistance $IS_1$. The meter is thus capable of indicating line balance as well as incoming current reversals in a manner similar to that of the prior art.

When it is desired for monitoring purposes the attendant may transmit monitoring impulses simultaneously over both line sections by operating sending key SK which in turn operates relay MR. The marking contacts for the armatures of relay MR derive marking potential from the armatures of the line relays whereas the spacing contacts are directly connected to spacing potentials. Thus, a marking impulse over line $L_1$ passes over the same transmitting circuit from the armature of relay $LR_2$ as described above for impulses regenerated by relay $LR_2$. A spacing monitoring impulse over line $L_1$ may be traced from spacing potential over left-hand back contact and armature of relay MR, normal contact and spring 13 and normal contact and spring 12 to the apex of resistance $IS_1$ and is then divided as already described over the line circuit $L_1$ and the balancing circuit $N_1$. It should be noted that when an operator at the distant station upon observing the incoming monitoring signals restores his transmitter to marking, the line condition will be such that the line relays $LR_1$ or $LR_2$ will have their armatures resting against their marking contacts so that unmutilated monitoring signals may be transmitted by means of sending key SK.

In the case when a fault has occurred say on line section $L_2$, the attendant in throwing the monitoring key MK to east disconnects this section and relay $LR_2$ from the circuit. Thus, the operation of spring 14 disconnects the armature of relay $LR_2$ from the marking contact of relay MR and connects marking potential directly to this contact so that monitoring impulses may be transmitted over line $L_1$ independent of the position of the armature of $LR_2$. The operation of spring 15 disconnects the apex of resistance $IS_2$ from the sounder circuit and connects a steady marking potential directly to the apex. The operation of spring 16, finally, disconnects the sounder circuit from the armature of the monitoring relay and connects it directly to the armature of line relay $LR_1$.

By now leaving the indicator key $IK_1$ in normal position connecting the meter $IM_1$ to the receiving circuit of line $L_1$ and by throwing the indicator key $IK_2$ to its operated position connecting the meter $IM_2$ to the sounder circuit for sounder $S_2$ which is directly connected to the armature of relay $LR_1$, the attendant is able to test the operation of the relay $LR_1$, while the relay is in operating condition in this circuit and without removing it from the circuit.

It is evident that since the circuit arrangement is symmetrical it is possible to perform similar operations when a fault occurs in line $L_1$.

The testing of a line relay such as $LR_2$ may also be performed when the monitoring key MK is in normal position. In such case standard reversals will be incoming over the line $L_2$, in response to a request by the attendant. The indicator key $IK_2$ will remain in its normal position, whereas indicator key $IK_1$ may be thrown to the sounder circuit for sounder $S_1$ which now is connected through the left-hand armature of relay MR to the armature of relay $LR_2$. The meter $IM_2$ thus is used for observation of incoming signals in the receiving circuit whereas the meter $IM_1$ operates in response to the regenerated impulses in the transmitting circuit from the armature of $LR_2$.

Even though the metering arrangement has been described above and is shown in the drawing as being applied to a telegraph repeater it is evident that such a metering arrangement may be applied to a full duplex terminal station. It is furthermore possible to provide a circuit arrangement whereby the meter may be used for testing at any point in the repeater circuit other than those described above and that by additional switching means the meter may be used for testing at any number of points in the circuit.

What is claimed is:

1. In a duplex telegraph repeater, a polar relay associated with one line section, another polar relay associated with the other line section, operating windings and armatures for said polar relays, a balancing network for each line section, circuit means interconnecting said windings, armatures, line sections and networks, a single circuit indicating device, a plurality of impedances included in said circuit means and switching means for connecting said indicating device across any one of said impedances for observation of the current flow in said impedances.

2. In a duplex telegraph system, a line relay having operating windings and an armature, a receiving circuit including a line section and a balancing network connected to said windings, a transmitting circuit connected to said armature, an indicating device, a pair of shunt impedances inserted differentially in said receiving circuit, a pair of series impedances connected to said transmitting circuit and switching means for connecting said indicating device to either of said pair of impedances.

3. In a duplex telegraph direct point repeater, a polar relay associated with one line section, another polar relay associated with the other line section, each relay having a pole changing armature adapted to repeat signals into the other line, current indicating devices and a switch for each of said devices having switch points connected to said relays so that said devices may give simultaneous comparative indications of the character of the signals incoming to and outgoing from either one of said relays.

4. In a duplex telegraph repeater, equipment associated with one line section, another equipment associated with another line section, each one of said equipments comprising a polar relay having a pole changing armature, a receiving circuit including a pair of windings of said relay and a balancing network, a transmitting circuit connected to said armature, a current indicating device, switching means for said device, a resistance inserted in said receiving circuit, an impedance including the winding of a sounder connected to the transmitting circuit of the other equipment, a pair of switch points included in said switching means for connecting said device across said resistance for observation of incoming signals, and another pair of switch points for connecting said device across said impedance for observation of outgoing signals.

5. In a duplex telegraph direct point repeater, a vibrating polar relay having a main winding associated with one line section, another vibrating polar relay having a main winding associated with another line section, each relay having a pole changing armature adapted to repeat signals into the other line, a monitoring relay having pole changing contact means and normally deriving a transmitting potential through the armature of each of said polar relays for transmission of monitoring impulses over the main windings of the other of said polar relays and the associated line section, a sending key for operating said monitoring relay, means for disassociating said monitoring relay from one of said polar relays in case of trouble and for at the same supplying said transmitting potential directly to said pole changing contact means and supplying a fixed potential to the line section showing trouble to permit transmission of monitoring pulses over the other of said line sections by the operation of said monitoring key.

6. In a duplex telegraph direct point repeater, a vibrating polar relay having a main winding associated with one line section, another vibrating polar relay having a main winding associated with another line section, each relay having a pole changing armature adapted to repeat signals into the other line, a monitoring relay having two pole changing armatures, one of said armatures being connected through the main winding of one of said polar relays to one of said line sections for transmission of monitoring impulses and the other armature of said monitoring relay having contact means connected through the pole changing armature of said one polar relay to spacing potential, a monitoring key for operating said monitoring relay, means for disconnecting said one line section from the armature of said monitoring relay and for disconnecting said contact means from the armature of said one polar relay and for connecting marking potential to said main winding and said contact means when said line section is in a faulty condition to disable said one line section and to provide marking potential for transmission of monitoring signals over the other of said lines.

7. In a duplex telegraph repeater a first self-vibrating polar relay having a pair of main windings connected to a first line section, a second self-vibrating polar relay having a pair of main windings connected to a second line section, each of said vibrating relays having pole changing contact means adapted to repeat signals into the other line, a monitoring relay having two pole changing armatures each for normally transmitting simultaneous monitoring impulses through a main winding of one of said vibrating relays to the connected line section and each deriving a transmitting potential through said contact means on the other of said vibrating relays, a monitoring key for the operation of said monitoring relays, a receiving circuit including the main windings of said first vibrating relay, a transmitting circuit including in series the contact means of said second vibrating relay and one of said pole changing armatures, an indicating device, a resistance inserted in said receiving circuit, an impedance including the winding of the sounder, switching means for connecting said indicating device across said resistance or said impedance for observation of incoming or outgoing signals, respectively, through the main windings of said first relay, said impedance being normally connected to said transmitting circuit so that monitoring signals may be observed on said device and said sounder, a common switching means for disassociating said monitoring relay from said first vibrating relay in case of trouble and for supplying said transmitting potential directly to an armature of said monitoring relay for transmission of monitoring pulses over said second line, and for switching the connection to said transmission circuit for said impedance so that only signals produced at the contact means of said second vibrating relay may be observed on said device and said sounder.

8. In a telegraph system, a repeater comprising a pair of relays, each having an input circuit connected to an associated line section and an output circuit connected to the other line section, a current indicating device for indicating the quality of the signals in the input circuit of one relay, a second current indicating device, and switching means whereby said second device may indicate selectively the character of the signals in either the output circuit of the first relay or the input circuit of the second relay.

9. In a duplex telegraph repeater, a polar relay having a winding connected to one line section, a second polar relay having a winding connected to a second line section, each relay having a pole changing armature adapted to repeat signals through the winding of the other relay into the other line section, a current indicating device connected to the winding of the first relay, a second current indicating device, and switching means for selectively connecting said second device to either the armature of the first relay or the winding of the second relay, whereby said first device indicates the character of the signals received from the first line section and the second device indicates selectively the character of the signals repeated by the first relay or those received by the second relay.

In witness whereof, I hereunto subscribe my name this 2nd day of August, 1928.

GEORGE C. CUMMINGS.